(12) United States Patent
Burke et al.

(10) Patent No.: US 9,982,350 B2
(45) Date of Patent: May 29, 2018

(54) MULTILAYER COMPOSITE FUEL CLAD SYSTEM WITH HIGH TEMPERATURE HERMETICITY AND ACCIDENT TOLERANCE

(71) Applicant: WESTINGHOUSE ELECTRIC COMPANY LLC, Cranberry Township, PA (US)

(72) Inventors: Michael A. Burke, Pittsburgh, PA (US); Edward J. Lahoda, Pittsburgh, PA (US); Paolo Ferroni, Pittsburgh, PA (US); Fausto Franceschini, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 285 days.

(21) Appl. No.: 14/956,892

(22) Filed: Dec. 2, 2015

(65) Prior Publication Data
US 2017/0159186 A1 Jun. 8, 2017

(51) Int. Cl.
*C23C 24/04* (2006.01)

(52) U.S. Cl.
CPC .................................. *C23C 24/04* (2013.01)

(58) Field of Classification Search
CPC ........... F22B 37/002; G21C 3/07; G21C 3/20; G21C 3/06; B32B 15/14; B32B 37/14; B32B 1/08; B32B 9/00; B32B 9/04; B32B 15/20; B32B 27/14; B32B 5/02; B29C 53/58
USPC ................ 376/416, 414, 417; 428/34.6, 34.5
See application file for complete search history.

(56) References Cited

U.S. PATENT DOCUMENTS

| | | | |
|---|---|---|---|
| 4,029,545 A | 6/1977 | Gordon et al. | |
| 5,182,077 A * | 1/1993 | Feinroth | G21C 3/07 376/414 |
| 5,260,137 A * | 11/1993 | Rosenthal | C22C 47/068 428/549 |
| 6,243,433 B1 * | 6/2001 | Adamson | G21C 3/07 376/305 |
| 2009/0032178 A1 | 2/2009 | Feinroth | |
| 2011/0286570 A1 | 11/2011 | Farmer et al. | |
| 2012/0087457 A1 * | 4/2012 | Garnier | C04B 35/565 376/416 |
| 2014/0153688 A1 | 6/2014 | Zabiego et al. | |

OTHER PUBLICATIONS

PCT/US2016/058384, International Search Report and Written Opinion, dated Feb. 16, 2017, 12 Pages.

* cited by examiner

*Primary Examiner* — Camie S Thompson
(74) *Attorney, Agent, or Firm* — Joseph C. Spadacene; Westinghouse Electric Company LLC

(57) ABSTRACT

The invention relates to a multilayer cladding including a combination of ceramic and metallic components. The multilayer coating includes an inner layer, an intermediate layer and an outer layer. The inner layer can form the cladding structure, the intermediate layer can include a ceramic composite or ceramic-containing composite composed of interlocking woven or braided fibers, e.g., fiber tows wrapped on the inner layer to form a woven structure, and a matrix material, and the outer can be composed of metal or metal alloy, such as, in the form of a coating. The multilayer cladding is effective to protect contents of the cladding structure from exposure to high temperature environments.

13 Claims, 2 Drawing Sheets

MULTILAYER COMPOSITE FUEL CLAD SYSTEM WITH HIGH TEMPERATURE HERMETICITY AND ACCIDENT TOLERANCE

BACKGROUND

1. Field

The invention relates to cladding composed of a multilayer composite for use in high temperature environments to serve as a barrier to protect the contents of the cladding, and methods of making the composites. More particularly, the invention relates to a multilayer composite fuel cladding for use in a reactor having water, liquid metal or liquid salt coolant.

2. Description of Related Art

A power reactor can include a reactor core having a large number of fuel assemblies, each of which is composed of a plurality of elongated fuel elements or fuel rods. Fuel assemblies vary in size and design depending on the desired size of the core and the size of the reactor. The fuel rods each contain fissile fuel material, such as, fuel pellets containing uranium with some amount of fissile U235 or U233 and/or plutonium. Fission of the fissile components causes heat generation. A coolant, such as water, liquid salt, gas or a liquid metal, e.g., lead, is pumped through the reactor core to extract the heat generated in the reactor core for the production of useful work such as electricity.

Each of the fuel rods has a cladding that acts as containment to hold the radioactive fuel material and to separate the fuel material from the coolant medium. Further, during operation, fission generates gaseous and volatile and non-volatile fission products that are highly radioactive, which are also restrained by the cladding. In conventional metallic cladding systems, irradiation over time causes damage to the metal in terms of hardening and embrittlement and material swelling.

FIG. 1 illustrates a prior art fuel cladding design which shows a stack of fuel pellets 10, a zirconium-based cladding 12, a spring hold down device 14, and end plugs 16.

Recent developments in the art have provided fuel rod cladding composed of a ceramic-containing material, such as silicon carbide (SiC). SiC has been shown to exhibit desirable properties in beyond design basis accidents, e.g., at temperatures greater than 1200° C. in light water reactors and, therefore, may be considered a suitable material of construction for nuclear fuel rod claddings. However, maintaining fission gas impermeability during flexing induced by handling or accidents or natural phenomena, such as earthquakes, is difficult due to the natural inelasticity of ceramic materials generally. Fastening end plugs on SiC tubes in a high throughput, economic manner yielding a hermetic seal at temperatures beyond 1200° C. is also difficult.

There is a desire in the art to provide a cladding material that provides high temperature mechanical strength and stability, swelling resistance and corrosion resistance, while providing protection and hermeticity to an external environment. There has not been found a single material that can provide all of the desirable properties for a cladding. Thus, an object of the invention is to provide a composite that includes more than one material, each exhibiting a different property that is advantageous for a cladding.

SUMMARY OF THE INVENTION

In one aspect, the invention provides a ceramic- and metallic-containing multilayer cladding that includes an inner layer, having an interior surface and an exterior surface, composed of metal or metal alloy; an intermediate layer having an interior surface and an exterior surface, formed on the exterior surface of the inner layer, and including a composite that includes interlocking ceramic fibers and a matrix selected from ceramic matrix, metal matrix or combinations thereof, or interlocking ceramic fibers; and an outer layer deposited on the exterior surface of the intermediate layer composed of metal or metal alloy.

The composite can include woven or braided silicon carbide fibers and a silicon carbide matrix, or woven or braided alumina fibers and an alumina matrix.

The outer layer can include an alumina-forming metal alloy with an oxidation resistant coating thereon. In certain embodiments, the outer layer includes iron-chromium-aluminum alloy optionally with an addition of yttrium.

In another aspect, the invention provides a method for forming a ceramic- and metallic-containing multilayer cladding. The method includes forming an inner layer having an interior surface and an exterior surface composed of metal or metal alloy; applying an intermediate layer, having an interior surface and an exterior surface, to the exterior surface of the inner layer, with the intermediate layer including a composite that includes interlocking ceramic fibers and a matrix selected from ceramic matrix, metal matrix or combinations thereof, or interlocking ceramic fibers; and depositing an outer layer composed of metal or metal alloy on the exterior surface of the intermediate layer.

The applying of the intermediate layer can include obtaining ceramic fibers in a form of fiber tows; wrapping, winding or braiding the tows onto the inner layer; forming a woven ceramic fiber structure, wherein voids are formed therein; and depositing the matrix over the woven ceramic fiber structure employing a process selected from chemical vapor deposition, chemical vapor infiltration and sol gel infiltration, to at least partially fill the voids.

In certain embodiments, the outer layer is formed by a process selected from arc, liquid phase or cold spraying.

BRIEF DESCRIPTION OF THE DRAWINGS

A further understanding of the invention can be gained from the following description of the preferred embodiments when read in conjunction with the accompanying drawing in which.

DESCRIPTION OF THE PREFERRED EMBODIMENT

The present invention relates generally to a multilayer material for forming a cladding, methods for preparing the multilayer material, and methods for preparing the cladding composed of the multilayer material. The multilayer cladding includes a combination of ceramic and metal components. The multilayer material includes an inner layer, an intermediate layer and an outer layer. In general, the inner layer can be composed of a metal or alloy to form a hermetic barrier for fission products and may also provide some mechanical support for the remainder of the cladding structure; the intermediate layer can include a ceramic composite or ceramic-containing composite composed of interlocking woven or braided fibers, e.g., fiber tows wrapped on the inner layer to form a woven structure, and a matrix material; and the outer layer can be composed of metal or metal alloy, such as, in the form of a coating. In general, the multilayer cladding is an effective barrier to protect contents contained within the cladding structure from exposure to high temperature environments and mechanical stresses. For example, the cladding may be suitable for use as fuel cladding for containing nuclear fuel in reactor environments having water, liquid salt or liquid metal coolant circulating at very high temperatures, such as, but not limited to, lead-cooled fast reactors. The fuel cladding has the capability to withstand normal and accident conditions associated with said reactors. For ease of description, the invention is described herein in the context of a fuel cladding for containing or holding radioactive fuel pellets, wherein the cladding is placed in a reactor core and exposed to high temperature coolant circulating around the outside of the cladding and through the core. However, it is understood that the invention is not limited to this context. It is contemplated that the multilayer composite cladding of the invention may be applicable to non-radioactive, e.g., non-nuclear, applications and may include any high temperature heat or mass transfer application wherein at least one fluid (liquid or gas) phase requires separation from another solid, fluid (gas or liquid) phase or mixed phase system (such as solid fuel pellets with gaseous fission products), in such cases as in high temperature energy generating and storage applications, including but not limited to, solar power (using high temperature heat transfer) combustion and fossil-based power technology.

Figure 1:
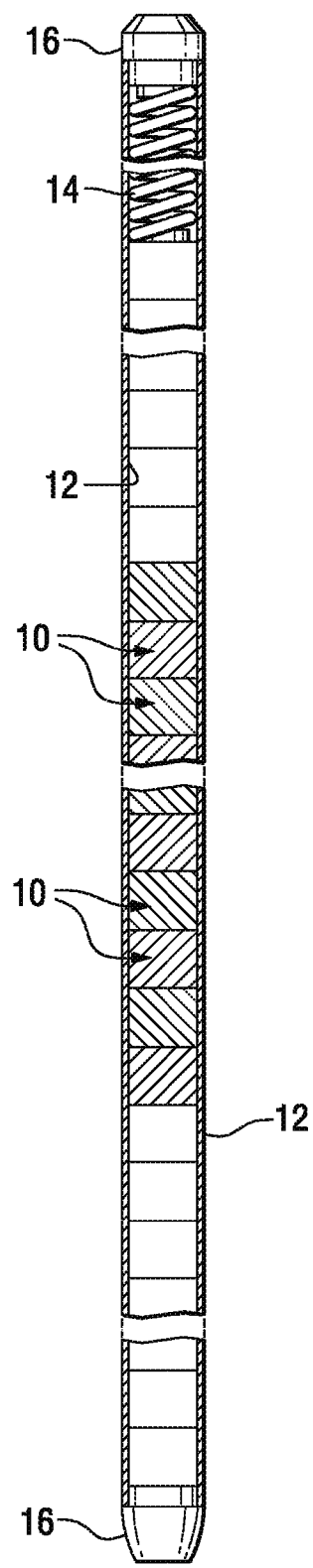
FIG. 1 is a schematic showing a fuel cladding, in accordance with the prior art.

Fuel rod cladding is typically in the shape of an elongated tube having a cavity formed therein and two opposing open ends. The thickness of the tube wall can vary. In certain embodiments, the tube wall thickness is from about 100 to about 1000 microns. The cavity has fuel pellets contained therein and typically a hold-down device, such as a spring, to maintain the configuration, e.g., a stack, of the fuel pellets. A sealing mechanism is typically positioned at or in each open end of the cladding to provide a seal and prevent the coolant circulating in the core from entering the cavity of fuel rod cladding. As shown in FIG. 1. The fuel rod cladding is positioned in the core of the nuclear reactor.

Fuel rod cladding, generally, is primarily intended to contain fissile fuel pellets in which fission is causing heat generation and to separate the fuel pellets and fission products resulting from fission from the coolant medium. The cladding is typically composed of either a metallic material (metal or metal alloys), or alternatively a ceramic material. There are advantages and disadvantages associated with each of the metallic cladding and ceramic cladding. For example, metallic cladding provides good hermeticity, good ductility, adjustable strength and reformable protective corrosion resistant layers. In contrast, ceramic cladding provides high stiffness, high temperature strength, high temperature survivability in oxidative and corrosive environments. The fuel rod cladding in accordance with the invention provides a multilayer material system that combines both metal/metal alloy and ceramic materials, such that properties and advantages associated with each of these materials can be exhibited in the cladding.

In general, the fuel rod cladding composed of the multilayer material system avoids problems associated with conventional ceramic composite systems, such as, difficulty in achieving hermeticity while retaining material ductility and high temperature strength. Without intending to be bound by any particular theory, it is believed that this property conflict is due to the need for fine scale matrix cracking in the composite ceramic matrix which promotes (e.g., pseudo-ductility) extension during straining of the ceramic material. In addition, the cladding in accordance with the invention can provide accident tolerance capability based on a unique fabrication of the ceramic composite. As a result, the fuel rod cladding of the invention can provide high temperature performance and corrosion protection of fuel in a thermal or fast reactor. The coolant is liquid- or gas-based and, in particular, may be a molten metal, such as lead.

Figure 2:
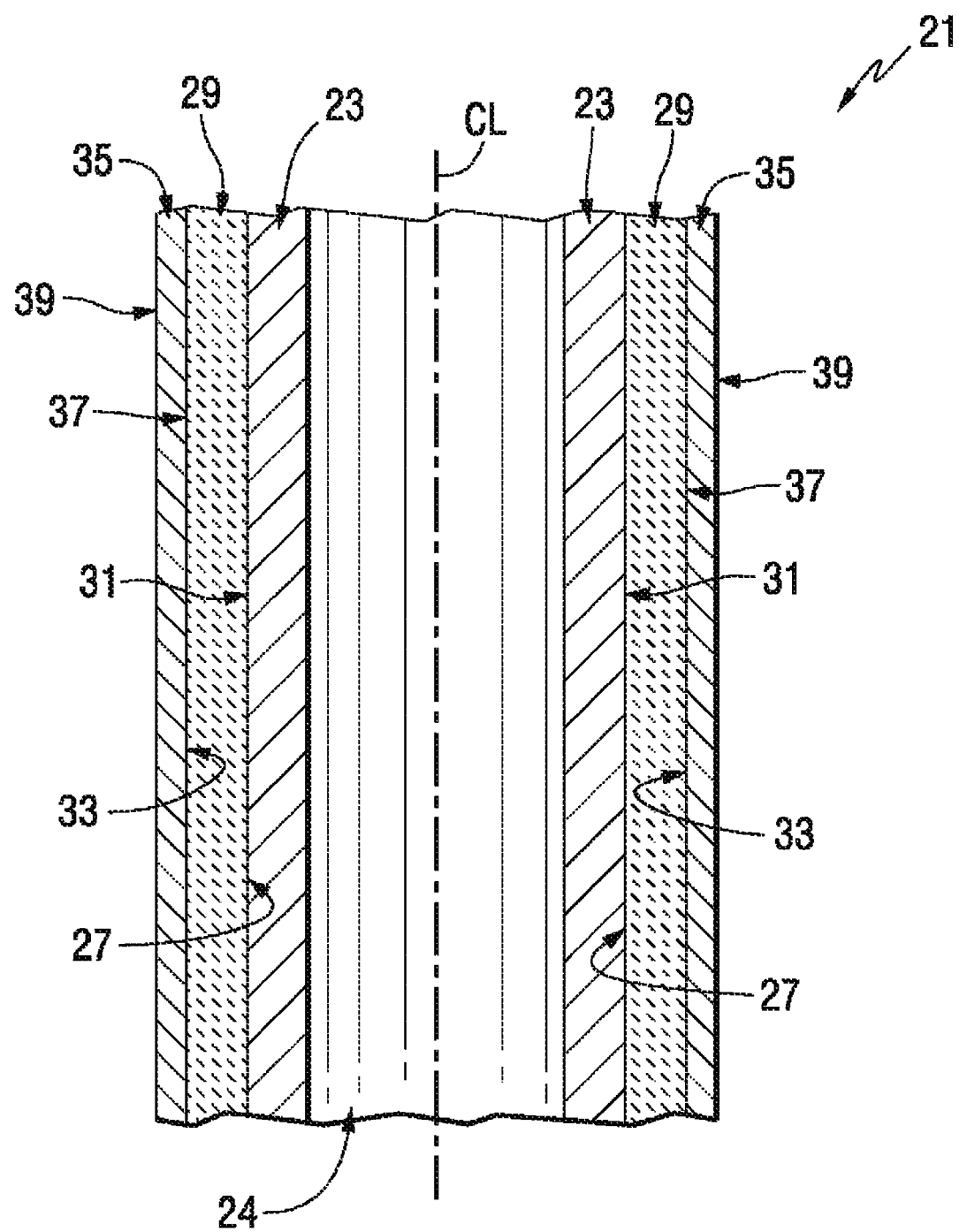
FIG. 2 is a schematic showing an axial cross-sectional view of a multilayer cladding, in accordance with certain embodiments of the invention.

FIG. 2 shows a multilayer cladding 21 in the form of a cylindrical tube. It is contemplated and understood that the shape of the cladding is not limiting and can include a wide variety of shapes and configurations. For example, the cladding can be in the form of a box structure or other closed form including two-dimensional axially or conically extended structures. Further, the structure may be consistently shaped or inconsistently shaped; that is, the shape may be adjusted to accommodate variations in diameter along its length. Furthermore, it is contemplated that the cylindrical tube may be used in a variety of environments, such as, but not limited to, a reactor wherein the cladding 21 has contained therein a fuel element. In FIG. 2, the cladding 21 includes an inner layer 23, an intermediate layer 29 and an outer layer 35. As shown in FIG. 2, the inner layer 23 is in the form of a tube, which, as a non-limiting example, may be a preformed cylinder, including an inner cavity 24, an interior surface 25 and an exterior surface 27. The inner layer 23 is composed of metal or metal alloy. In general, the material of the inner layer 23 is selected to exhibit good hermeticity, a compliant surface, moderate strength and good ductility. Suitable metals and metal alloys for use in forming the inner layer 23 include, but are not limited to, austenitic steels, ferritic martensitic steels, zirconium alloys, iron alloys, titanium alloys or layered combinations thereof. Austenitic and ferritic martensitic steels are typically for use in fast spectrum reactors and zirconium alloys, such as but not limited to, Zircaloy, are typically for use in thermal spectrum reactors. Selection of a specific steel material can depend on the balancing of certain factors, such as, toughness, irradiation embrittlement, swelling and neutron absorption. The thickness of the inner layer 23 can vary. For example, the inner layer 23 can have a thickness in the range from about 100 to about 300 microns. The inner layer 23 is typically formed using conventional apparatus and processes, such as, for forming a tubular fuel cladding. For example, the inner layer 23 may be formed by conventional tube manufacturing, such as, tube drawing or pilgering. However, the inner layer 23 may be made by deposition processes such as liquid or arc spraying, liquid dipping or solid state sintering over a removable core. In such processes, the removable core may be retained through other processing steps to facilitate the multilayer fabrication of the multilayer structure.

The intermediate layer 29 is applied to the exterior surface 27 of the inner layer 23. As shown in FIG. 2, the intermediate layer 29 has an interior surface 31 and an exterior surface 33. The intermediate layer 29 can be composed of a ceramic composite, which includes interlocking woven or braided, e.g., wound, ceramic fibers and a ceramic matrix. Optionally, the intermediate layer 29 can be composed of the interlocking woven or braided ceramic fibers in the absence of a ceramic matrix. Further, optionally, the intermediate layer 29 can be composed of a ceramic-containing composite that includes interlocking woven or braided ceramic fibers and a metal matrix. In certain embodiments, the interlocking woven or braided fibers can include a combination of ceramic fibers and metallic fibers. A key feature of the invention is that ceramic fibers are woven or braided in a mechanically self-interlocking structure such that they are capable of providing mechanical support in the absence of a mechanically constraining matrix between the fibers/fiber tows. The ceramic component(s), e.g., both of the fibers and matrix when employed, of the intermediate layer 29 exhibits high strength and stiffness at both reactor normal operating temperature and at higher temperatures that are typical of design basis and beyond design basis accidents. It is known that brittleness is associated with ceramic and therefore, the intermediate layer of the cladding material can be formed of a combination of ceramic fibers and matrix. This construction of material allows for limited but finely divided arrested local cracking in the material matrix while effectively retaining much of the strength and stiffness of the interlocking fiber structure. By constraining the ceramic composite (intermediate layer 29) between inner and outer layers (the inner layer 23 and the outer layer 35) this retention of mechanical properties is enhanced. Suitable ceramic fiber and ceramic matrix materials for use in forming the intermediate layer 29 include, but are not limited to silicon carbide, alumina and, mixtures and combinations thereof. For example, silicon carbide fibers, alumina fibers or a combination thereof can be combined with a silicon carbide matrix, an alumina matrix or a combination thereof. Suitable metal materials for the matrix can include iron-based or nickel-based alloys, titanium- or zirconium-based systems, and combinations or mixtures thereof. The thickness of the intermediate layer 29 can vary. In certain embodiments, the intermediate layer 29 can have a thickness in the range from about 200 to about 600 microns.

The intermediate layer 29 is typically formed using conventional apparatus and processes. For example, the intermediate layer 29 may be formed by pre-stressing a fiber component to form the fibers into tows, under and over wrapping or winding the tows, e.g., at +/−45 degrees, to form a crossing weave. As a result, the intermediate layer 29 provides not only for support under operational conditions but also ensures continuing support, e.g., in the form of a "sock", for the internal fuel pellets under accident conditions wherein the metallic elements (e.g., inner layer 23 and outer layer 35) may be lost, perforated, corroded or oxidized.

In certain embodiments, a cladding tube (e.g., the inner layer 23 in FIG. 2), is wrapped, wound or braided with ceramic (e.g., silicon carbide and/or alumina) fibers. The wrapping, winding or braiding can be conducted such that the process is initiated at one end (which can be open or sealed) of the cladding tube and is completed at the opposite end. The thickness of the deposited fibers may vary and, for example, may form a layer that is about 200 microns to about 600 microns thick. Typically, there are voids that exist between individual or groups of fibers and therefore, following the wrapping, winding or braiding step, the ceramic (e.g., silicon carbide and/or alumina) or metal matrix material is applied to at least partially fill the voids formed between the fibers.

The matrix material can be deposited or applied by employing chemical vapor infiltration (CVI) or chemical vapor deposition (CVD) technology. As used herein, CVI refers to depositing matrix material in pores using decomposed gaseous matrix precursors and CVD refers to depositing matrix material on surfaces using decomposed gaseous matrix precursors. In certain embodiments, CVI is conducted at temperatures from about 300° C. to about 1100° C. depending on the particular CVI process and apparatus employed. Traditional decomposition-based CVI occurs from about 900° C. to about 1100° C. In certain embodiments, atomic layer deposition-based SiC deposition is carried out at temperatures from about 300° C. to about 500° C.

Alternatively, a sol gel infiltration, drying and firing process may be used to form the composite material, e.g., the intermediate layer 29 in FIG. 2.

The outer layer 35 is applied or deposited in the form of a coating on the exterior surface 13 of the intermediate layer 29. As shown in FIG. 2, the outer layer 35 has an interior surface 37 and an exterior surface 39. The outer layer 35 is composed of metal or metal alloy. In general, the material of the outer layer 35 is selected to separate the outer environment, e.g., water, gas, liquid salt or liquid metal, from the intermediate layer 29 and to provide a protective layer over the intermediate layer 29; in particular, in the event that the ceramic matrix undergoes cracking as the composite strains to accommodate mechanical deformation. In general, the material of the outer layer 35 is sufficiently ductile that the layer remains intact over the entire coating and that, in the event of cracking or damage to the protective exterior surface 39, the protective aspect of the surface is capable of being reformed. This reformable protective layer provides a chemical and physical barrier to ingress of the liquid coolant to the fiber weave of the intermediate layer 29. Suitable metals and metal alloys for use in forming the outer layer 35 can include, but are not limited to, alumina-forming metallic alloys with an oxidation resistant coating. In certain embodiments, iron-based Fe—Cr—Al alloys with additions of nickel (Ni) and rare earth elements such as yttrium (Y) are preferred. However, other stable alloys with environmentally compatible coatings such as, high temperature nickel alloys and stainless steels can be used for the outer layer 35. In a preferred embodiment for fuel cladding in a lead-cooled reactor, the outer layer is in the form of a coating composed of iron-chromium-aluminum alloy with the addition of yttrium (FeCrAl(Y)), which has metallic ductility to high strength but retains the ability to re-form its protective alumina coating in the event that cracking if the exterior surface 39 occurs. The coating thickness of the outer layer 35 can vary. For example, the outer layer 35 can have a thickness in the range from about 20 microns to several millimeters. However, optimum thicknesses can be in a range from about several tens of microns at one extreme (the lower thickness to accommodate the surface variability formed by wrapped ceramic fiber tows) to about 1 mm at the other extreme. (The upper thickness provides a ductile coating that can deform with the underlying ceramic material without cracking). Thicknesses of the outer layer on the order of several tens of microns to one to two hundred microns are preferred, depending on the thickness of the intermediate layer. That is, the thicknesses of the outer layer should be about 10% of the thickness of the intermediate layer.

The outer layer 35 is typically formed using conventional coating apparatus and deposition processes. For example, the outer layer 35 may be formed by arc, liquid phase or cold-spraying the outer layer having a thickness that is sufficiently thick to fill-in surface interstices of the underlying composite intermediate layer 29, provide complete coverage of the cladding surface, and to retain the capability to reform a protective surface layer over the lifetime of the cladding. In certain embodiments, aluminum in the outer layer is oxidized to form a protective adherent alumina layer. In such embodiments, the alumina-rich metallic material is deposited as a metallic system in a vacuum or under a non-oxidizing atmosphere and once the metallic layer has been deposited, air or oxygen may be applied to the surface of the deposited material, either as a pervasive atmosphere or directed gas stream. Heating the metallic structure and/or the gas under controlled conditions will affect the oxidation of the top of the metallic layer and the formation of the desired protective oxide outer layer.

The use of metal inner and outer layers 23,35 allows for the control of the near end structure such that conventional metal-to-metal joining techniques may be employed to seal the end of the tube. In certain embodiments, at least one of the inner layer 23 and the outer layer 35 extend beyond the intermediate layer 29 such that the extension or overlap on each end is capable of being joined together by conventional joining techniques, such as, brazing or welding, to seal each open end of the cladding tube. For example, fuel pellets can be loaded into the cavity of the fuel cladding and subsequently, the outer layer 35 applied thereto, whereby a portion of the outer layer 35 extends beyond the intermediate layer 29 and this overlap is joined together on each end of the cladding tube to seal the open ends. Alternately, one end seal may be formed, e.g., by welding, to close an open end of the cladding, the fuel pellets are loaded into the cavity and then, the other open end of the cladding is sealed.

In certain embodiments, fabrication of one or more of the inner, intermediate and outer layers may be conducted prior to or following loading of the fuel into the cavity of the cladding. Furthermore, the multilayer cladding can be constructed, e.g., laid-up, and formed, e.g., co-extruded, to provide improved shaping and consolidation.

The fuel rod cladding in accordance with the invention provides at least one or more of the following benefits as compared to conventional claddings known in the art:
Hermeticity of the interior surface of the cladding tube with respect to gaseous and volatile fuel fission products;
Capability to demonstrate high temperature strength and toughness, as well as swelling resistance and void formation resistance in response to irradiation;
Mechanical tolerance to very high temperatures and high mechanical strains;
Mechanical support and containment of fuel debris in the event of accident conditions based on woven structure (intermediate layer); and
Corrosion resistance and oxidation protection of the surface of the multilayer material system that simultaneously provides hermetic sealing of the surface of a ceramic composite in the event of micro-cracking of the ceramic matrix and capability to reform an outside protective oxide layer.

During operation in a reactor, internal pressure generated by gas production from the fuel is restrained by the cladding. The cladding functions include containing the fuel and fuel fission products, providing mechanical strength and stability, and providing protection and hermeticity to the external environment are provided by the inner layer, the ceramic or ceramic-containing composite intermediate layer and the outer layer, respectively. Thus, the need for high temperature strength, swelling resistance and, corrosion resistance in a single material is avoided. The inner and outer metallic layers may provide some mechanical strength, but a key mechanical property of these layers is the capability to deform with the ceramic intermediate layer without cracking. Thus, in the event of accident conditions, where high temperature must be tolerated for a short time and separation of the various fuel elements must be maintained but, post-accident retention of the capabilities to retain 100% mechanical integrity for re-use is not required, failure by extensive oxidation/corrosion of the metallic parts of the cladding system would not be catastrophic. The remaining, post-accident structure of the fuel cladding essentially consists of the high temperature-tolerant, ceramic and, in particular, the retained mechanically supporting fiber weave, (intermediate layer 29) that exhibits fuel debris-containing capability, i.e., such that the remaining oxidized structure acts as the woven "sock" to retain the fuel pellets.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A ceramic- and metallic-containing multilayer cladding, comprising:
    an inner layer having an interior surface and an exterior surface composed of metal or metal alloy, structured to form a cavity therein for containing nuclear fuel;
    an intermediate layer having an interior surface and an exterior surface, formed on the exterior surface of the inner layer, the intermediate layer comprising:
        a composite, comprising:
            interlocking ceramic fibers and
            a matrix selected from the group consisting of ceramic matrix, metal matrix and combinations thereof; or
        interlocking ceramic fibers; and
    an outer layer having an interior surface and an exterior surface, in a coating form composed of aluminum or aluminum alloy deposited on the exterior surface of the intermediate layer.

2. The multilayer cladding of claim 1, wherein the inner layer is structured to form a cylindrical tube.

3. The multilayer cladding of claim 1, wherein the inner layer comprises a material selected from the group consisting of austenitic steel, ferritic-martensite steel, iron alloy, zirconium alloy, titanium alloy and layered combinations thereof.

4. The multilayer cladding of claim 1, wherein the composite comprises woven or braided silicon carbide fibers and a silicon carbide matrix.

5. The multilayer cladding of claim 1, wherein the composite comprises woven or braided alumina fibers and an alumina matrix.

6. The multilayer cladding of claim 1, wherein the ceramic fibers are in a form of fiber tows configured in a woven or wound structure.

7. The multilayer cladding of claim 1, wherein the matrix is deposited onto and into a woven or wound ceramic fiber structure.

8. The multilayer cladding of claim 1, wherein the outer layer is an alumina forming metal alloy with an oxidation resistant coating thereon.

9. The multilayer cladding of claim 8, wherein the outer layer comprises iron-chromium-aluminum alloy optionally with an addition of yttrium.

10. A method of forming a ceramic- and metallic-containing multilayer cladding, comprising:
    forming an inner layer having an interior surface and an exterior surface composed of metal or metal alloy, structured to form a cavity therein for containing nuclear fuel;

applying an intermediate layer having an interior surface and an exterior surface, to the exterior surface of the inner layer, the intermediate layer comprising:
  a composite, comprising:
    interlocking ceramic fibers and
    a matrix selected from the group consisting of ceramic matrix, metal matrix and combinations thereof; or
  interlocking ceramic fibers; and
depositing an outer layer having an interior surface and an exterior surface in a coating form composed of aluminum or aluminum alloy on the exterior surface of the intermediate layer.

11. The method of claim 10, wherein applying the intermediate layer comprises:
  obtaining ceramic fibers in a form of fiber tows;
  wrapping, winding or braiding the tows onto the inner layer;
  forming a woven ceramic fiber structure, wherein voids are formed therein; and
  depositing the matrix over the woven ceramic structure employing a process selected from chemical vapor deposition, chemical vapor infiltration and sol gel infiltration, to at least partially fill the voids.

12. The method of claim 10, wherein the outer layer encapsulates the inner layer and intermediate layer of the ceramic- and metallic-containing multilayer cladding.

13. The method of claim 10, wherein the outer layer is formed by a process selected from arc, liquid phase or cold spraying.

* * * * *